(12) United States Patent
Yang et al.

(10) Patent No.: US 10,338,394 B2
(45) Date of Patent: Jul. 2, 2019

(54) WEARABLE ELECTRONIC APPARATUS

(71) Applicant: Shenzhen Royole Technologies Co., Ltd., Shenzhen, Guangdong (CN)

(72) Inventors: Songling Yang, Guangdong (CN); Chao Jiang, Guangdong (CN); Songya Chen, Guangdong (CN); Zihong Liu, Guangdong (CN)

(73) Assignee: SHENZHEN ROYOLE TECHNOLOGIES CO., LTD., Shenzhen, Guangdong (CN)

( * ) Notice: Subject to any disclaimer, the term of this patent is extended or adjusted under 35 U.S.C. 154(b) by 37 days.

(21) Appl. No.: 15/553,416

(22) PCT Filed: Apr. 30, 2015

(86) PCT No.: PCT/CN2015/078150
§ 371 (c)(1),
(2) Date: Aug. 24, 2017

(87) PCT Pub. No.: WO2016/172988
PCT Pub. Date: Nov. 3, 2016

(65) Prior Publication Data
US 2018/0107005 A1    Apr. 19, 2018

(51) Int. Cl.
*G02B 27/01* (2006.01)
*H04R 5/033* (2006.01)
*H04R 1/10* (2006.01)

(52) U.S. Cl.
CPC ......... *G02B 27/0176* (2013.01); *G02B 27/01* (2013.01); *H04R 5/033* (2013.01); *H04R 1/10* (2013.01)

(58) Field of Classification Search
USPC .................................................... 345/1.1, 8
See application file for complete search history.

(56) References Cited

U.S. PATENT DOCUMENTS 3,237,203 A * 3/1966 Nielsen ............... A42B 3/225
2/10
5,815,126 A * 9/1998 Fan ..................... G02B 27/017
345/7

(Continued)

FOREIGN PATENT DOCUMENTS

CN    102918443 A    2/2013
CN    104254025 A    12/2014
(Continued)

OTHER PUBLICATIONS

English translation of the International Search Report dated Jan. 7, 2016 for corresponding International Application No. PCT/CN2015/078150, filed Apr. 30, 2015.
(Continued)

*Primary Examiner* — Calvin C Ma
(74) *Attorney, Agent, or Firm* — David D. Brush; Westman, Champlin & Koehler, P.A.

(57) ABSTRACT

A wearable electronic apparatus is provided. The wearable electronic apparatus includes: a head-mounted headphone having two sound generators and an elastic headband connected to the two sound generators; a display assembly having two end parts and a central part located between the two end parts; and two connecting mechanisms. Each of the two connecting mechanisms is connected to one of the two sound generators corresponding to the connecting mechanism and connected to one of the two end parts of the display assembly corresponding to the connecting mechanism, so that the end part of the display assembly is configured to deflect with respect to the sound generator.

12 Claims, 3 Drawing Sheets

(56) References Cited

U.S. PATENT DOCUMENTS

| | | | |
|---|---|---|---|
| 8,942,404 B1 | 1/2015 | Serota | |
| 2005/0256675 A1 | 11/2005 | Kurata | |
| 2006/0062417 A1* | 3/2006 | Tachikawa | H04R 1/1066 |
| | | | 381/378 |
| 2011/0273365 A1 | 11/2011 | West et al. | |
| 2013/0047322 A1* | 2/2013 | Peebles | A63B 71/10 |
| | | | 2/421 |
| 2013/0222215 A1* | 8/2013 | Kobayashi | G06F 3/011 |
| | | | 345/8 |
| 2014/0176398 A1* | 6/2014 | West | G02B 27/0176 |
| | | | 345/8 |
| 2015/0016654 A1 | 1/2015 | Serota | |
| 2015/0205135 A1* | 7/2015 | Border | G02B 27/0172 |
| | | | 359/630 |
| 2018/0003986 A1 | 1/2018 | Guo et al. | |

FOREIGN PATENT DOCUMENTS

| | | |
|---|---|---|
| CN | 104503083 A | 4/2015 |
| CN | 104503086 A | 4/2015 |
| CN | 104536135 A | 4/2015 |
| EP | 0818186 A2 | 1/1998 |
| EP | 1541966 A1 | 6/2005 |
| EP | 3217684 A1 | 9/2017 |
| JP | 2004085476 A | 3/2004 |
| JP | 2004096224 A | 3/2004 |
| WO | 2015054322 A1 | 4/2015 |

OTHER PUBLICATIONS

Written Opinion of the International Search Report dated Jan. 7, 2016 for corresponding International Application No. PCT/CN2015/078150, filed Apr. 30, 2015.

English translation of the Office action from KIPO dated Apr. 13, 2018, for KR application 20177022690.

English translation of an Office Action from State Intellectual Property Office, dated Jul. 17, 2017, for Chinese Application No. 201580001763.0.

Office Action from European Patent Office, dated Jul. 27, 2018, for EP application 15890368.2.

English translation of the Office Action from the Korean Intellectual Property Office, dated Aug. 30, 2018, for Korean Application No. 20187016433.

English translation of the International Written Opinion dated Jan. 28, 2016 for corresponding International Application No. PCT/CN2015/078150, filed Apr. 30, 2015.

* cited by examiner

WEARABLE ELECTRONIC APPARATUS

CROSS REFERENCE TO RELATED APPLICATION

The present application is a Section 371 U.S. National Stage Application of International Application No. PCT/CN2015/078150, filed on Apr. 30, 2015, the content of which is incorporated herein by reference in its entirety, and published as WO 2016/172988 A1, on Nov. 3, 2016, not in English.

FIELD

The present disclosure relates to a wearable electronic apparatus, and particularly to a wearable electronic apparatus having connecting structures rotatable with respect to one another.

BACKGROUND

At present, a wearable electronic apparatus becomes more and more popular because of its great visual experience effect. The wearable electronic apparatus usually includes a video part and an audio part. In order to achieve a great audio effect, some wearable electronic apparatus adopt a head-mounted headphone. In this case, the video part is rotatably connected to the head-mounted headphone. When the wearable electronic apparatus is not in use, the video part is rotated to a position where the video part is substantially coincided with the head-mounted headphone for a convenient storage. When the wearable electronic apparatus is needed to be used, the video part is rotated to a position defining an included angle of substantially 90 degrees between the video part and the head-mounted headphone. Accordingly, when the wearable electronic apparatus is put on, the video part is located in front of eyes.

In the process that a user puts on the wearable electronic apparatus, the head-mounted headphone needs to be expanded firstly so as to be worn on the head. However, when expanding the head-mounted headphone, the video part is also expanded along with the head-mounted headphone. The resilience of the deformed video part increases the strength required for expanding the headphone, which is unbeneficial for operation. Meanwhile, after being used many times, the video part tends to be damaged, thus reducing a service life of the product.

SUMMARY

Embodiments of the present disclosure provide a wearable electronic apparatus which is convenient to operate and beneficial to improve service life of the product.

The wearable electronic apparatus includes: a head-mounted headphone having two sound generators and an elastic headband connected to the two sound generators; a display assembly having two end parts and a central part located between the two end parts; and two connecting mechanisms, wherein each of the two connecting mechanisms is connected to one of the two sound generators corresponding to the connecting mechanism and connected to one of the two end parts of the display assembly corresponding to the connecting mechanism, so that the end part of the display assembly is configured to deflect with respect to the sound generator.

In the present disclosure, by providing the connecting mechanism, the end part of the display assembly may deflect with respect to the sound generator, so that, the end part of the display assembly will not be bent or deformed in the deformation process. Thus, a deformation resilience which increases the strength required for expanding the headphone is not generated, and hence it is convenient for the user to use.

BRIEF DESCRIPTION OF THE DRAWINGS

The following accompanying drawings are used for illustrating various embodiments of the present disclosure in detail in combination with specific embodiments. It should be understood that various elements illustrated in the accompanying drawings do not represent actual sizes and scale relations, and the accompanying drawings are only schematic views intended for clear illustration. Thus, the accompanying drawings should not be construed to limit the present disclosure.

DETAILED DESCRIPTION

In order to make the objectives, technical solutions and advantages of the present disclosure more definite and clear, the present disclosure is further illustrated in detail in combination with a plurality of embodiments and accompanying drawings. It should be understood that, the specific embodiments described herein are only used for explaining the present disclosure and not for limiting the present disclosure. It must be noted that, the "connection" between two elements mentioned in the present disclosure does not necessarily refer to a direct connection, it may be an indirect connection achieved through a third element.

Figure 1:
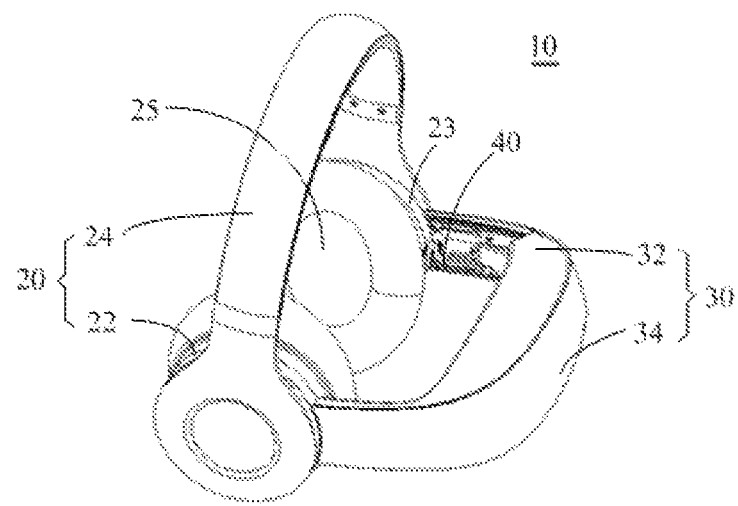
FIG. 1 is a schematic view of a wearable electronic apparatus provided in a first embodiment of the present disclosure.

In combination with FIG. 1, which is a schematic view of a wearable electronic apparatus 10 provided in a first embodiment of the present disclosure, the wearable electronic apparatus 10 may be a wearable video player, a wearable game apparatus or a wearable navigation apparatus and the like. The wearable electronic apparatus 10 includes a head-mounted headphone 20, a display assembly 30 and two connecting mechanisms 40 configured to connect the head-mounted headphone 20 to the display assembly 30.

The head-mounted headphone 20 includes two sound generators 22 and an elastic headband 24 connected with the two sound generators 22. The elastic headband 24 has a substantially C shape, and the two sound generators 22 are fixedly connected to two ends of an opening of the C shape of the elastic headband 24. The two sound generators 22 can be clamped over the ears through an elastic force of the elastic headband 24. There is not much difference between a structure of the head-mounted headphone 20 and a structure of a head-mounted headphone in the related art, and thus the structure of the head-mounted headphone 20 will not be repeated here. The display assembly 30 includes two end parts 32 and a central part 34 located between the two end parts. The central part 34 may also be substantially C-shaped, and an optical unit and a display unit configured for near-eye display (not illustrated in the drawings) are provided at a middle portion of the central part 34. The two end parts 32 are connected to the two sound generators 22 via the connecting mechanisms 40 respectively. As illustrated in FIG. 1, when the user wears the wearable electronic apparatus 10, the display assembly 30 is located in front of the eyes. Accordingly, the user may view the image projected to the eyes by the display assembly 30 and meanwhile hear the audio by means of the head-mounted headphone 20.

Figure 2:
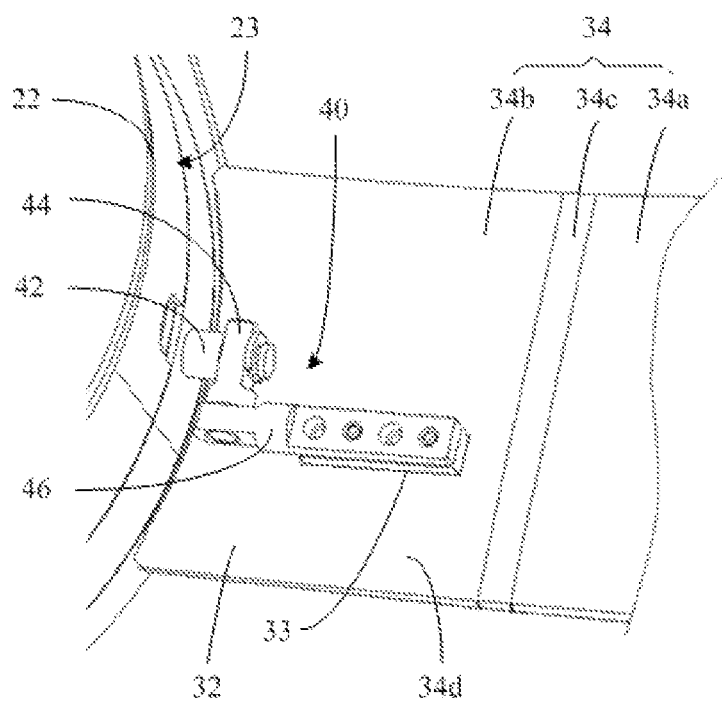
FIG. 2 is a partial enlarged view of the wearable electronic apparatus in FIG. 1.
Figure 3:
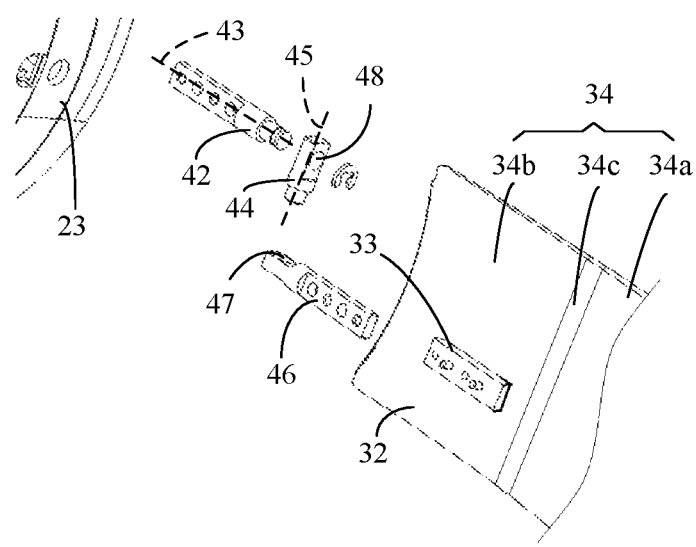
FIG. 3 is an exploded view of a connecting mechanism in FIG. 2.

In combination with FIG. 2 and FIG. 3, the connecting mechanism 40 includes a first connecting piece 42, a second connecting piece 44 and a third connecting piece 46. The first connecting piece 42 is fixed to the sound generator 22, the third connecting piece 46 is fixed to the end part 32 of the display assembly 30, and the second connecting piece 44 is connected to the first connecting piece 42 and the third connecting piece 46, so that the end part 32 may deflect with respect to the sound generator 22. Specifically, in the embodiment, the first connecting piece 42 is a first rotating shaft having a first axis 43 extending substantially from the sound generator 22 to the end part 32. The first connecting piece 42 extends outwards from a side surface 23 of the sound generator 22, and a certain included angle is formed between the side surface 23 and a sounding surface 25 of the sound generator 22 where sound is emitted. In the embodiment, the included angle is about 90 degrees, and the first connecting piece 42 extends outwards from the side surface 23 substantially perpendicularly. Certainly, in other embodiments, the included angle may be other degrees, and the first connecting piece 42 is not limited to extending outwards from the side surface 23. For example, the first connecting piece 42 may extend outwards from a surface opposite to the sounding surface 25.

The second connecting piece 44 is a second rotating shaft including a first shaft sleeve 48 and a second axis 45, and the first shaft sleeve 48 is configured to be fitted over the first connecting piece 42. In the embodiment, the first shaft sleeve 48 is an opening formed in a first end of the second connecting piece 44 and located in the first end of the second connecting piece 44. Certainly, in other embodiments, the first shaft sleeve 48 may be a shaft sleeve in other forms. An included angle of a certain degree is formed between the first shaft sleeve 48 and the first connecting piece 42 when the first shaft sleeve 48 is fitted over the first connecting piece 42. In the embodiment, the included angle is about 90 degrees. Certainly, it may be understood that the included angle is not limited to this. At this moment, the second connecting piece 44 may rotate around the first axis 43 of the first connecting piece 42.

The third connecting piece 46 is a third rotating shaft including a second shaft sleeve 47 configured to be fitted over the second connecting piece 44. In the embodiment, the second shaft sleeve 47 is an opening formed in a first end of the third connecting piece 46. A second end of the third connecting piece 46 without the second shaft sleeve 47 is fixed to the end part 32 of the display assembly 30. In a similar way, in other embodiments, the second shaft sleeve 47 may be a shaft sleeve in other forms. The second shaft sleeve 47 is fitted over a second end of the second connecting piece 44 without the first shaft sleeve 48. Accordingly, the third connecting piece 46 may rotate around the second axis 45 extending from the first connecting piece 42 to the third connecting piece 46, and an included angle of a certain degree is formed between the third connecting piece 46 and the second axis 45. In the embodiment, the included angle is about 90 degrees. In a similar way, the included angle may be other degrees in other embodiments.

In the absence of external forces, a schematic view in which the end part 32 of the display assembly 30 is connected to the sound generator 22 by means of the connecting mechanism 40 is illustrated in FIG. 2. When the user intends to put on or take off the wearable electronic apparatus 10, it is required to apply forces to the two sound generators 22 so as to move the two sound generators 22 away from each other, and in this way, a distance between the two sound generators 22 increases. However, as the third connecting piece 46 may rotate around the second axis 45 of the second connecting piece 44, a degree of outward bend and deformation of the two end parts 32 of the display assembly 30 in such deformation process is greatly reduced, and thus a resilience produced by the end 32 of the display assembly 30 due to the outward bend and deformation thereof is also greatly reduced, thereby making it convenient for the user to use.

In addition, in the above deformation process, an included angle between the two sounding surfaces 25 also changes. However, as the second connecting piece 44 may rotate around the first axis 43 of the first connecting piece 42, the two end parts 32 of the display assembly 30 will not incline along with the sound generators 22 to twist in the above deformation process. Thus, the strength of the user required for pulling the two sound generators 22 away from each other is reduced, and it is convenient for the user to use.

Preferably, the end part 32 is provided with a protruding block 33, the third connecting piece 46 is fixed to the protruding block 33, so that each of the first connecting piece 42, the second connecting piece 44 and the third connecting piece 46 has a distance from an inner surface of end part 32, thus increasing a range convenient for a deformation of the sound generator 22.

Figure 4:
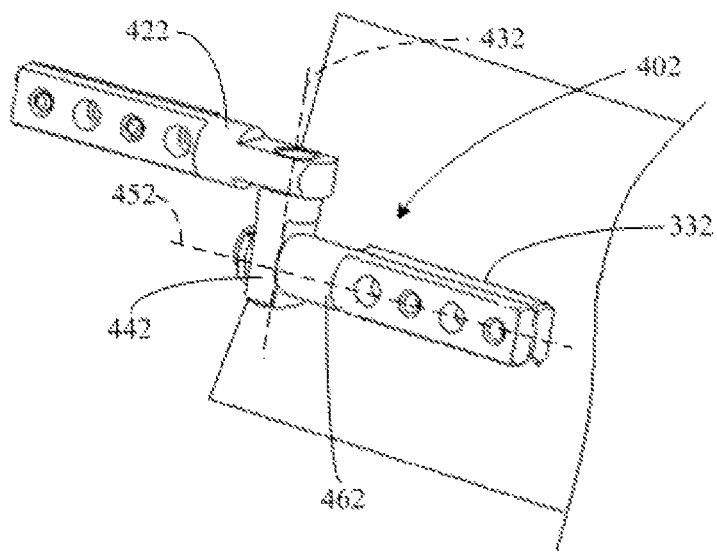
FIG. 4 is a schematic view of a connecting mechanism of a wearable electronic apparatus provided in a second embodiment of the present disclosure.

It may be understood that, an implementation of the technical objective of the present disclosure is not limited to the connecting mechanism 40 in the first embodiment mentioned above. For example, the technical objective of the present disclosure may be also implemented by a connecting mechanism 402 in a second embodiment as illustrated in FIG. 4. As illustrated in FIG. 4, the second embodiment has a same principle as the first embodiment, but differs from the first embodiment in a specific connection manner among a first connecting piece 422, a second connecting piece 442 and a third connecting piece 462. Specifically, a first shaft sleeve of the first connecting piece 422 is fitted over a first end of the second connecting piece 442, a second shaft sleeve at a second end of the second connecting piece 442 is fitted over a first end of the third connecting piece 462, and a second end of the third connecting piece 462 is fixed to the end part 32. The first shaft sleeve of the first connecting piece 422 defines a first axis 432 extending from a first side of the sound generator 22 adjacent to the elastic headband 24 to a second side of the sound generator 22 away from the elastic headband 24. The second shaft sleeve of the second connecting piece 442 defines a second axis 452 extending from the sound generator 22 to the end part of the display assembly. Similar to the first embodiment, the second connecting piece 442 may rotate around the first axis 432 of the first connecting piece 422, and the third connecting piece 462 may rotate around the second axis 452 of the second connecting piece 442. It may be understood by those skilled in the related art that the technical objective of the first embodiment can also be realized by this kind of connection manner. Preferably, the end part 32 is provided with a protruding block 332, and the third connecting piece 462 is fixed to the protruding block 332, so that each of the first connecting piece, the second connecting piece and the third connecting piece has a distance from an inner surface of end part 32, thus increasing a range convenient for the deformation of the sound generator 22.

Figure 5:
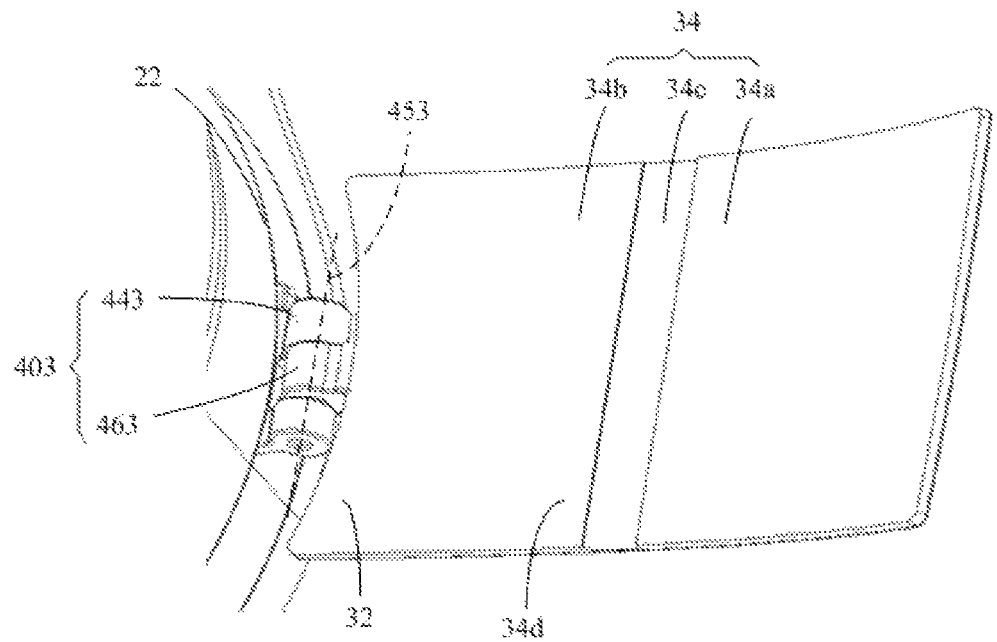
FIG. 5 is a schematic view of a connecting mechanism of a wearable electronic apparatus provided in a third embodiment of the present disclosure.

In combination with FIG. 5, which is a schematic view of a connecting mechanism 403 in a third embodiment of the present disclosure, the connecting mechanism 403 only differs from the connecting mechanism 40 in the first embodiment in that the connecting mechanism 403 only includes structures serving as the second connecting piece 44 and the third connecting piece 46 in the first embodiment. Specifically, in the embodiment, the connecting mechanism 403 includes a second connecting piece 443 and a third connecting piece 463, but does not include a structure serving as the first connecting piece 42 in the first embodiment. In the embodiment, the second connecting piece 443 includes two first shaft holes defining a second axis 453, and the third connecting piece 463 includes a second shaft hole fixed to the two first shaft holes by means of a pin. Accordingly, the third connecting piece 463 may rotate around the second axis 453 of the second connecting piece 443, that is, the end part 32 rotates with respect to the sound generator 22 around the second axis 453. Although lacking a function that the end part 32 may rotate with respect to the sound generator 22 around the first axis 43, this kind of structure also has a function of reducing the deformation resilience of the display assembly 30 mentioned in the first embodiment. Certainly, the above second connecting piece 443 may also be disposed to the display assembly 30, and thus the third connecting piece 463 is disposed to the headphone 22.

Figure 6:
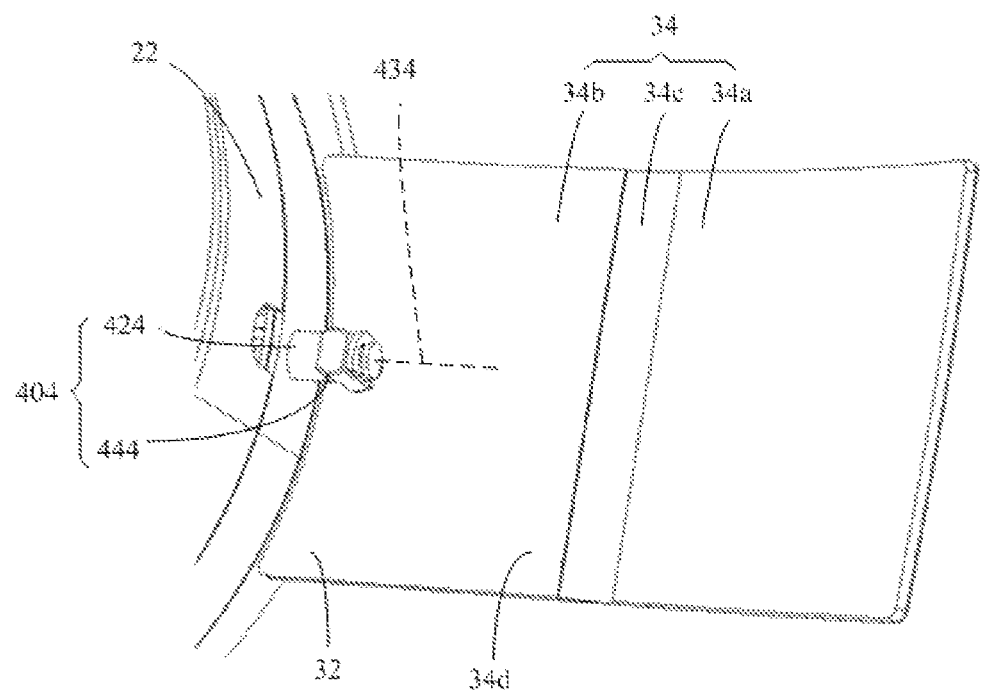
FIG. 6 is a schematic view of a connecting mechanism of a wearable electronic apparatus provided in a fourth embodiment of the present disclosure.

In combination with FIG. 6, which is a schematic view of a connecting mechanism 404 in a fourth embodiment of the present disclosure, the connecting mechanism 404 only differs from the connecting mechanism 40 in the first embodiment in that the connecting mechanism 404 only includes a first connecting piece 424 and a second connecting piece 444, but does not include the third connecting piece in the first embodiment. In the embodiment, the first connecting piece 424 is a column extending outwards from a side surface of the sound generator 22, and the second connecting piece 444 is a shaft sleeve fixed to the end part 32 of the display assembly. Accordingly, the second connecting piece 444 may rotate with respect to the sound generator 22 around a first axis 434 of the first connecting piece 424. Similarly, this kind of structure also has a function of reducing the deformation resilience of the display assembly 30 mentioned in the first embodiment. In a similar way, positions of the first connecting piece 424 and the second connecting piece 444 may also be exchanged.

Preferably, in the third embodiment and the fourth embodiment, in combination with FIG. 5 and FIG. 6, the central part 34 further includes a main body 34a for display, connecting portions 34b respectively located at two opposite ends of the main body 34a, and an elastic piece 34c. The connecting portion 34b includes a connecting end 34d opposed to the above end part 32, and the connecting end 34d is connected to the main body 34a by means of the elastic piece 34c. It may be understood that the connecting portion 34b and the end part 32 may be connected as separate members, or may be integrated in one piece. The elastic piece 34c may be made of materials such as rubber. In the third embodiment, when the sound generator 22 is moved outwards, an upper side of the connecting portion 34b in FIG. 5 deflects in a direction which is faced to an inner surface of the connecting portion 34b along with a movement of the sound generator 22, and hence the elastic piece 34c is deformed, so as to protect the main body 34a from being deformed. Accordingly, the function of the first connecting piece 42 provided in the first embodiment may also be implemented. In the fourth embodiment, when the sound generator 22 is moved outwards, the connecting portion 34b may deflect outwards around the deformed elastic piece 34c along with the movement of the sound generator 22, and thus the function of the third connecting piece 46 provided in the first embodiment may also be implemented. In summary, by providing the elastic piece 34c, an included angle between the connecting portion 34b and the main body 34a, i.e. an included angle in two dimensions, may be changed through a deformation of the elastic piece. The elastic piece 34c may be made of materials such as silica gel.

Preferably, in the above first and second embodiments, the central part 34 may also include a main body 34a for display, connecting portions 34b respectively located at two opposite ends of the main body 34a, and an elastic piece 34c. Specific structures are same with those described in the preceding paragraph and thus will not be repeated here. In these two embodiments, the elastic piece 34c is stretchable and retractable in a direction extending from the main body 34a to the connecting end 34d. As a distance between the two sound generators 22 will increase when the two sound generators 22 are moved outwards, a characteristic that the elastic piece 34c is stretchable and retractable adapts the elastic piece 34c to its own change in the deformation process, so that the deformation required for the display assembly 30 is further reduced, hence further facilitating operations of the user.

It may be known from the plurality of above embodiments that the technical effect to be implemented in the present disclosure can be achieved if the connecting mechanism has the function of rotating around any one of the first axis 43 or the second axis 45 in the first embodiment. In the specification and claims, cases that the end part 32 rotates around the first axis 43, or rotates around the second axis 45, or rotates around both the first axis 43 and the second axis 45 simultaneously, are collectively called as that the end part 32 deflects with respect to the sound generator 22.

Certainly, in various embodiments described above, the connecting mechanisms 40, 402, 403, 404 each may also be an elastic piece described above, which may allow the end part 32 to deflect with respect to the sound generator 22 as mentioned in the preceding paragraph, or may be stretchable as mentioned above. The objective of the present disclosure may also be achieved by this kind of embodiment.

The above descriptions are only preferable embodiments of the present disclosure and are not intended to limit the present disclosure. Any modifications, equal alternatives, and improvements made within the spirit and principle of the present disclosure should be included in the protection scope of the present disclosure.

What is claimed is:

1. A wearable electronic apparatus, comprising:
   a head-mounted headphone having two sound generators and an elastic headband connected to the two sound generators;
   a display assembly having two end parts and a central part located between the two end parts; and
   two connecting mechanisms, wherein each of the two connecting mechanisms is connected to one of the two sound generators corresponding to the connecting mechanism and connected to one of the two end parts of the display assembly corresponding to the connecting mechanism, so that the end part of the display assembly is configured to deflect with respect to the sound generator, wherein each of the connecting mechanisms comprises:

a first connecting piece fixing to the sound generator and defining a first axis; and a second connecting piece connecting to the end part, the second connecting piece connecting to the first connecting piece and configured to rotate around the first axis with respect to the first connecting piece, wherein the first connecting piece extends in a first direction, the second connecting piece extends in a second direction, and the first direction keeps perpendicular to the second direction when the second connecting piece rotates around the first axis with respect to the first connecting piece, wherein the first axis extends from the sound generator to the end part, and the first direction is parallel to the first axis, wherein the first connecting niece comprises a first rotating shaft extending from the sound generator to the end part of the display assembly, and the second connecting piece comprises a first shaft sleeve fitted over the first rotating shaft, wherein each of the connecting mechanisms further comprises a third connecting piece fixed to the end part, the second connecting piece is connected to the end part by means of the third connecting piece, the second connecting piece defines a second axis extending from the first connecting piece to the third connecting piece, and the third connecting piece is configured to rotate around the second axis.

2. The wearable electronic apparatus according to claim 1, wherein the second connecting piece comprises a second rotating shaft having the second axis and the first shaft sleeve, and the third connecting piece comprises a second shaft sleeve extending from the end part of the display assembly to the sound generator and connected with the second rotating shaft.

3. The wearable electronic apparatus according to claim 1, wherein the first axis is perpendicular to the second axis.

4. The wearable electronic apparatus according to claim 1, wherein the end part is further provided with a protruding block, and the third connecting piece is fixed to the protruding block, so that each of the first connecting piece, the second connecting piece and the third connecting piece has a distance from an inner surface of the end part.

5. The wearable electronic apparatus according to claim 1, wherein the central part further comprises a main body configured for displaying images, connecting portions respectively located at two opposite ends of the main body, and an elastic piece, the connecting portion comprises a connecting end opposite to the end part, the connecting end is connected to the main body by means of the elastic piece, and the elastic piece is stretchable and retractable at least in a direction extending from the main body to the connecting end.

6. The wearable electronic apparatus according to claim 5, wherein an included angle between the connecting portion and the main body is configured to change through a deformation of the elastic piece.

7. The wearable electronic apparatus according to claim 1, wherein each of the connecting mechanisms is an elastic piece.

8. A wearable electronic apparatus, comprising:

a head-mounted headphone having two sound generators and an elastic headband connected to the two sound generators;

a display assembly having two end parts and a central part located between the two end parts; and two connecting mechanisms, wherein each of the two connecting mechanisms is connected to one of the two sound generators corresponding to the connecting mechanism and connected to one of the two end parts of the display assembly corresponding to the connecting mechanism, so that the end part of the display assembly is configured to deflect with respect to the sound generator, wherein each of the connecting mechanisms comprises:

a first connecting piece fixing to the sound generator and defining a first axis; and a second connecting piece connecting to the end part, the second connecting piece connecting to the first connecting piece and configured to rotate around the first axis with respect to the first connecting piece, wherein the first connecting piece extends in a first direction, the second connecting piece extends in a second direction, and the first direction keeps perpendicular to the second direction when the second connecting piece rotates around the first axis with respect to the first connecting piece, wherein the first axis extends from a first side of the sound generator adjacent to the elastic headband to a second side of the sound generator far away from the elastic headband, and the first direction is perpendicular to the first axis, wherein the first connecting piece comprises a first rotating shaft provided with a first shaft sleeve having the first axis, and the second connecting piece comprises a second rotating shaft connected to the first shaft sleeve, wherein each of the connecting mechanisms further comprises a third connecting piece fixed to the end part, the second connecting piece is connected to the end part by means of the third connecting piece, the second connecting piece defines a second axis extending from the sound generator to the end part of the display assembly, and the third connecting piece is configured to rotate around the second axis.

9. The wearable electronic apparatus according to claim 8, wherein the end part is further provided with a protruding block, and the third connecting piece is fixed to the protruding block, so that each of the first connecting piece, the second connecting piece and the third connecting piece has a distance from an inner surface of the end part.

10. The wearable electronic apparatus according to claim 8, wherein the first axis is perpendicular to the second axis.

11. The wearable electronic apparatus according to claim 8, wherein the central part further comprises a main body configured for displaying images, connecting portions respectively located at two opposite ends of the main body, and an elastic piece, the connecting portion comprises a connecting end opposite to the end part, the connecting end is connected to the main body by means of the elastic piece, and the elastic piece has elasticity at least in a direction extending from the main body to the connecting end.

12. The wearable electronic apparatus according to claim 11, wherein an included angle between the connecting portion and the main body is configured to change through a deformation of the elastic piece.

\* \* \* \* \*